United States Patent [19]

Enomoto et al.

[11] Patent Number: 4,537,735

[45] Date of Patent: Aug. 27, 1985

[54] METHOD OF PRODUCING A SILICON CARBIDE SINTERED COMPACT

[75] Inventors: Ryo Enomoto; Kiyotaka Tsukada, both of Oogaki, Japan

[73] Assignee: Ibiden Kabushiki Kaisha, Oogaki, Japan

[21] Appl. No.: 479,331

[22] Filed: Mar. 28, 1983

[30] Foreign Application Priority Data

Mar. 29, 1982 [JP] Japan .................................. 57-48957

[51] Int. Cl.$^3$ ............................................. C04B 35/56
[52] U.S. Cl. ........................................ 264/63; 264/65; 501/88; 501/90
[58] Field of Search ...................... 501/90, 88; 264/65, 264/63

[56] References Cited

U.S. PATENT DOCUMENTS 4,342,837 8/1982 Suzaki et al. .......................... 501/90

FOREIGN PATENT DOCUMENTS 57-145076 9/1982 Japan .

57-196768 12/1982 Japan ..................................... 501/90

Primary Examiner—Mark L. Bell
Attorney, Agent, or Firm—Balogh, Osann, Kramer, Dvorak, Genova & Traub

[57] ABSTRACT

In a method of producing a silicon carbide sintered compact comprising steps of placing silicon carbide fines, a sintering additive and a shaping additive as required into a dispersing medium solution to form a supensoid, sieving operation on said suspensoid, forming a green shape from powders obtained in said sieving operation, and pressureless sintering process; an improvement characterized is that solid content comprising said silicon carbide fines and sintering additive is limited within a range of 10-50% by volume to said suspensoid, and that in the sieving operation, the suspensoid is passed through a sieve having an opening less than 65 μm under a pressure differential between before and after the sieve to remove coarse particles in the silicon carbide fines, sintering additive and others to form silicon carbide sintered compact having a high strength.

4 Claims, 3 Drawing Figures

METHOD OF PRODUCING A SILICON CARBIDE SINTERED COMPACT

FIELD OF THE INVENTION

The present invention relates generally to manufacture of sintered products of silicon carbide, especially to manufacturing process of sintered compacts of silicon carbide having high strength and high reliability.

BACKGROUND OF THE INVENTION

Silicon carbide is one of the most suitable materials for use under severe high temperature condition for example, gas turbine parts or high temperature heat exchangers due to its excellent chemical and physical properties.

Hithertofore, the pressure sintering and reaction sintering processes are widely known for sintering of silicon carbide. However, there have been some disadvantages in these processes, i.e., in the former it is difficult to obtain complicated configuration of the sintered body and of its low productivity, and in the latter it is difficult to obtain the sintered products having high strength and to use under high temperature due to its high content of free silicon.

Meanwhile, silicon carbide is one of variety of materials to be sintered with difficulty, and it has been observed difficult to apply the pressureless sintering generally adopted to manufacture of oxide ceramics wherein a green compact shaped under the normal temperature is sintered without pressure. Recently new pressureless sintering process have been reported wherein a mixed powder comprising silicon carbide, boron containing additive and carbonaceous additive is compacted and sintered under an inert atmosphere. For example, in accordance with U.S. Pat. No. 4,004,934, it is disclosed that silicon carbide is admixed with a boron containing additive (0.3–3.0% by weight of boron) and a carbon containing additive (0.1–1.0% by weight of carbon) is compacted and then sintered without pressure under an inert atmosphere and temperature of 1900°–2100° C. to give a sintered product having at least 85% of theoretical density.

As mentioned above, in the pressureless sintering process of silicon carbide the raw material for making sintered silicon carbide compacts (hereinafter referred to as sintering material) includes a boron containing additives and a carbonaceous additives as main sintering additives, and further includes in some cases, for example U.S. Pat. No. 4,172,109, beryllium etc. The reason for addition of the boron containing additive is to form an adhesive layer around the surface of the silicon carbide particles due to the coexistence of boron and to promote adhesion between the particles and to advance the uniform shrinkage, while the reason for addition of the carbonaceous additive is to remove silica membrane around the silicon carbide particle formed by reduction which hinders the self-sintering and promote the sintering process and at the same time to control the growth of crystalline grain. The carbonaceous material includes various organic substances or inorganic carbon fines. Therefore uniform dispersion of the above-mentioned additives in the sintering material is effective to obtain high quality products.

Meanwhile sintered silicon carbide compacts having high strength and reliability are desired due to the characteristics of silicon carbide. However, known compacts of high strength have been prepared by use of expensive beta-silicon carbide produced by thermal decomposition of organic silicon compound or silicon carbide produced by specific processes disclosed in for example Japanese Patent Disclosure No. 54-67599. It has been observed extremely difficult to produce high quality of sintered products with silica and carbon with conventional manner.

Inventors of the present application have studied the reason of inferior strength of sintered silicon carbide compacts resulting from the conventional process using silica and carbon, and found that inclusion of relatively coarse foreign matters cause pores and faults in sintered compacts resulting in the above-mentioned inferior strength. Thus it is most important that such inclusion should be avoided as possible.

Conventional methods for obtaining the sintering material without inclusion of such foreign matters which deteriorate the strength of sintered silicon carbide compacts are: (1) the production of the sintering material is performed in an isolated chamber without coarse foreign matters or dusts, and (2) foreign matters and dusts are removed by screen classification or sieve separation. However, the method (1) may be practised in a laboratory scale, but in an industrial scale bulk equipments are required and further a complete prevention of the inclusion is almost impossible. The method (2) is classified into wet and dry filtering processes. The dry filtering process is eventually not practical because of aggregating property of fine powders such as the sintering material which makes dispersion of the powders infeasible. On the other hand, in wet filtering process as disclosed in U.S. Pat. No. 4,004,934, the sintering material is mixed in a dispersing medium solution and passed through a sieve. Unfortunately the sieve shown in the above U.S. patent is of over 200 mesh (74 $\mu$m) and insufficient to remove foreign matter larger than 65 $\mu$m. Thus it can not be expected to appreciably promote the strength by use of sintering material obtained by filtering process.

One of the inventors has proposed an invention disclosed in Japanese Patent Disclosure No. 57-145076 wherein silicon carbide fine powders preferably admixed with sintering additive or shaping additively is shaped into a green compact and then pressureless sintered at least said silicon carbide fine being dispersed in an organic medium to form a suspensoid. The suspensoid is passed through a sieve of less than 44 $\mu$m under the influence of ultrasonic vibration, and then the powder is separated from the medium.

In the above-mentioned process it is not adequate to pass the powder through the sieve after admixture of silicon carbide fines, sintering additive and shaping additive because uniform dispersion of silicon carbide fines, sintering additive and shaping additive having respectively different properties such as specific weight and aggregating property for a long period of time resulting in segregation of the additive and varied proportion of silicon carbide fine, sintering additive and shaping additive giving adverse effects on the property of sintered products.

The present invention provides an improvement of the above-mentioned procedure wherein silicon carbide fine, sintering additive, or shaping additive added as required are placed in a dispersing medium solution to form a suspensoid, said suspensoid is treated through a sieve under pressure differential to remove relatively coarse foreign matters effectively.

As object of the present invention is to provide a feasible procedure for manufacturing silicon carbide sintered compact having high strength and reliability.

According to the present invention silicon carbide fine, sintering additive and shaping additive added as required are placed in a dispersing medium solution to form a suspensoid which is treated with a sieve, then the separated particles are formed into a green shape and pressureless sintered, said solid content of silicon carbide fine and sintering additive in the suspensoid being limited within 10–50% by volume, dispersing medium being added to said suspensoid, pressure differential being given to overcome the pressure loss generated between before and after a sieve of less than 65 $\mu$m with or without vibration of the suspensoid to remove relatively coarse foreign matters which cause faults of pores and inclusion thereof to achieve the above-mentioned object.

DETAILED DESCRIPTION OF THE INVENTION

Since it is important as described above, the sintering material comprising silicon carbide fine, sintering additive and shaping additive added as require should be in a form of uniformly dispersed condition and that said uniform mixture as it is should be subjected to the sieve treatment. As stated above, since silicon carbide fine and the sintering additive respectively having high aggregating property, it is difficult to maintain in a dispersing medium solution. Accordingly, no effective procedure is known to treat the solution with a sieve of less than 65 $\mu$m under an uniform suspended condition.

After extensive studies the inventors discovered a new group of dispersing media or agents having high affinity to silicon carbide and the sintering additive to form a suspensoid maintaining its stable suspending condition for a long period of time to be passed through a sieve of less than 65 $\mu$m.

The dispersing medium solutions which may be used for the present invention are classified roughly into water and organic liquids.

According to the present invention when water is used for the dispersing liquid, the dispersing media is at least one selected from a group consisting of amines, organic compounds having carboxyl group, organic compound having sulfo group, esters, ammonium compounds, organic compounds having ether linkage, carboxylic acid salts, aluminates, phosphates, complex phosphates, sulphonates and silicates. These include tetramethyl ammonium hydroxide, monoethanol amine, monoethyl amine, diethyl amine, trimethyl amine, propyl amine, isobutyl amine, monobutyl amine, di-n-propyl amine, tannic acid, sodium alginate, ammonium alginate, polyacrylic acid, polyacrylic acid amine, polyacrylic acid esters, polyacrylic acid ammonium, sodium lignin sulfonate, ammonium lignin sulfonate, sodium aluminate, ammonium aluminate and water glass.

The carbonaceous additives to disperse inorganic carbon fine when used include fatty acid salts, alkylbenzene sulphonates, straight-chain alkylbenzene sulphonates, alpha-olefin sulphonates, sulphonates of naphthalene-formalin condensate, and polyoxyethylene alkyl phenyl ether. These media may be used alone or combination thereof. The pH of the suspensoid may be adjusted with aqueous ammonia to promote the dispersion. It is preferred to adjust the pH within a range of 5.5–11.

On the other hand, when organic liquids are used as dispersing media, one or more members should be selected from a group consisting of amines, organic compounds having carboxyl group or sulfo group, and esters which include polyoxy fatty acid amines, sorbitan fatty acid esters, di-alkylsulfo succinic acid esters, fatty acids, alkyl amine salts and benzene sulfonic acid. When inorganic carbon fine is used as carbonaceous additive preferred dispersing media include polyoxysorbitan fatty acid esters, polyoxyethylene grycerine fatty acid esters, polyethylene glycol fatty acid esters, pentaerythritol fatty acid esters, propylene glycolic acid esters, cane sugar fatty acid esters, polyglycerine fatty acid esters, fatty acid alkanol amide and amineoxides. These may used alone or combination thereof.

The above-mentioned organic liquid include acetone, methanol, ethanol, butanol, hexane, butane, nonan, toluene, oxylene, ethylmethyl ketone, methyl isobutyl ketone, ethyl benzene, ethylene glycol, trichloroethylene, cryclohexane, nitro methane, nitro ethane, isopropyl alcohol, benzene and carbon tetrachloride.

The above-mentioned dispersing media or agents exhibit the effects which disintegrate aggregation of silicon carbide fines and sintering additives in the suspensoid, enhance the uniform dispersion of these particles, and lower the viscosity of the suspensoid to facilate the sieving operation.

According to the present invention, it is required that when silicon carbide fines, sintering additive and shaping additive added as required are suspended in a dispersing medium solution the solid content comprising the silicon carbide fines and the sintering additive should be present in a range of 10–50% by volume of the solution. The larger proportion of the solid content than 50% makes difficult to obtain an uniform dispersion, and to pass the sieve due to a high viscosity, while the smaller proportion than 10% enhances the uniform dispersion but gives an economical disadvantage due to a vast volume in the sieving process. Therefore the preferred rage is within 15–40% by volume.

According to the present invention the preferred range of addition of dispersing medium is 0.05–15% by weight to total weight of 100% of fines plus medium. Because the smaller amount makes difficult to maintain the uniform dispersion which causes ineffective sieving operation, while the larger amount of the medium to be used is not only uneconomical but also remaining medium adversely affect on the sintering operation.

Silicon carbide fines may be alpha-type-crystalline, beta-type crystalline, or amorphous powder, and combination thereof, and have preferably specific surface area of 5–50 $m^2/g$ and oxygen content of 0.1–1.0% by weight, and beta-type crystalline is advantageously used. Sintering additives which may be used for the present invention are primarily boron containing additives and/or carbonaceous additives, and other additives containing beryllium and aluminum.

The above-mentioned boron containing additives include boron, boron carbide, boron nitride, aluminum boride, boron phosphate and combination thereof, and the preferred range of addition is 0.1–3.0% by weight on a basis of boron content. Specifically the additive powder having at least specific surface area of 10 $m^2/g$ is advantageously used.

The above-mentioned carbonaceous additives include phenol resin, lignin sulfonate, polyvinyl alcohol, corn starch, sugar, molasses, coal tar pitch, alginate, polyphenylene, polymethyl phenylene and other organic compounds existing in the form of carbon at the beginning of sintering operation, and thermal decomposing carbon such as carbon black and acetylene black. The preferred range of the addition is 0.5-4.0% by weight, and the particles having at least 50 m$^2$/g of specific surface area at the beginning of sintering operation are advantageously used.

According to the present invention, a shaping additive may be added to the sintering material as required. Such shaping additive serves as lubricant or binder during shaping operation to minimize shaping defect. These additives serving as lubricant include CARBOWAX (a Registered Trademark of Union Carbide Corporation identifying polyethylene glycol), magnesium stearate, barium stearate, aluminum stearate, zinc stearate and stearic acid. The additive serving as binder include starch, dextrin, gum arabic, casein, sugar, molasses, Na-carboxymethyl cellulose, methyl cellulose, polyvinyl alcohol, polyvinyl methyl ether, polyacrylic amide, tannic acid, liquid paraffin, wax emulsion, ethyl cellulose, polyvinyl acetate and phenol resin etc. The additives having both effects as lubricant and binder include cellulose acetate, glycerol and polyethylene glycol, and these may be used alone or combination.

In the present invention, it is required to uniformly disperse the suspensoid before the sieving operation. Since the silicon carbide fines and sintering additives used for the invention have high aggregating property, when they are dispersed in a dispersing medium solution they are in the coagulating condition which hinders the sieving operation.

Uniform dispersing treatment may be carried through vibrating mill, Attoritor, ball mill, colloid mill, or high speed mixer. When a dispersing process is carried with agitation using impeller or screw, disintegration of the coagulation is insufficient, and the sieving operation can not be performed effectively. The former devices provide a strong shearing force and produce the desired uniform dispersion for short period of time.

Alternatively, the suspensoid is advantageously subjected to vibration of 1-400 Hz, because a standing suspensoid often settle the powders into coagulation which makes almost impossible the sintering operation. Also the vibration lowers the viscosity of the suspensoid to facilitate the sieving operation. A lower frequency than 1 Hz is insufficient for a uniform dispersion and lowering viscosity, while a higher frequency than 400 Hz exhibits a poor transmittance through the suspensoid. Thus the range of 1-400 Hz preferably 2-100 Hz is suitable.

Vibration applied to the suspensoid may be generated from mechanical or magnetic sourse or pulsating pump.

In the present invention, the pressure loss in the suspensoid before and after the sieve which causes stagnation of the flow may be compensated by an application of pressure differential to promote the flow through the sieve.

In accordance with the present invention the pressure applied above the sieve is desirably varied periodically in a range of 1/400-2 seconds. The periodical application of pressure may cause agitation in the suspensoid to promote the dispersion of silicon carbide fines and sintering additive and facilitate the sieve passage. A shorter period than 1/400 second retards the transmittance of the pressure fluctuation while a longer period than 2 seconds causes a low agitation. The preferred range is of 1/100-1.5 seconds.

In accordance with the present invention, the pressure applied above the sieve should have a pressure differential at least 0.5 kg/cm$^2$ between the maximum and minimum values, and at the maximum pressure application the pressure differential between the before and after sides of the sieve should be in a range of 0.2-5 kg/cm$^2$, while at the minimum pressure application such range should be $-0.5$-2 kg/cm$^2$. The above-mentioned pressure differential means the pressure value before the sieve substracted by the pressure value after the sieve.

When a pressure is applied to the suspensoid, various devices may be used, but a pulsating pump is advantageously used because it provides both pressurization and vibration simultaneously. One type of the pulsating pump is diaphragm pump.

In the present invention, an ultrasonic vibration may be applied to the suspensoid just above the sieve to further promote the dispersion of silicon carbide fines and sintering additive.

The sieve used for the present invention should have an opening less than 65 μm. A larger opening than 65 μm can not remove coarse foreign matters, and hence an opening lesser than 44 μm is to be used to obtain a sintered product having the desired characteristics. Fine foreign matters passing through an opening of 5 μm do not adversely affect the product but require a long sieving operation. Therefore, the preferred range of opening of 5-44 μm is selected for the present invention.

The suspensoid after the sieving operation or filtering may be processed through the wet shaping as it is, or through dry process after the removal of the dispersing medium solution and drying into a green shape.

The removal of the solution from the suspensoid and drying should be carried out maintaining a uniform mixing condition.

The removal of the solution may be performed; (1) spray drying for removing the solution in a short period of time by evaporation, or (2) freeze drying wherein a suspensoid is freezed in an atmosphere at a temperature lower than the melting point of the dispersing medium solution which may be removed by sublimation.

In the above (1) spray drying, segregation of sintering additive or shaping additive may be prevented due to the removal of the dispersing medium solution with evaporation, and the process may be carried out for a relatively short period of time. Therefore, in this process it is advantageous that the sprayed dropplet has as smaller diameter as possible. Further this process has an advantage to obtain powder material having an excellent fluidity.

In the above (2) freeze drying, the dispersing medium solution may be selected from a group consisting of cyclohexane and benzene, and water also may be used. In this drying process, the suspensoid is sprayed in an atmosphere maintained at a lower temperature than the melting point of the dispersing medium solution, then the frozen solution is dried up under a reduced pressure by sublimation. Since the sprayed dropplet provides a rapid heat exchange preventing the segregation of the fines and additives. The drying with sublimation also prevents the segregation of the fines, sintering additives and/or shaping additive while the uniform mixing condition is maintained. The freeze drying process also gives powder material having excellent fluidity and compactibility.

In the present invention, the process from the sieving or filtering operation to the shaping or compacting operation is advantageously practised in an isolated chamber free from coarse foreign matters, but subsequent operation after the shaping to green compact does not require such chamber.

According to the present invention, green shape produced as above are placed in a sintering furnace and sintered under an inert gas stream under a temperature range of 1900°–2300° C. to produce silicon carbide sintered compacts having a high strength and reliability.

The present invention will be described in detail on preferred embodiment with relation to the accompanying drawings.

DESCRIPTION ON DRAWINGS

DESCRIPTION OF PREFERRED EMBODIMENTS

EXAMPLE 1

Silicon carbide fines consisting primarily of beta-type crystalline are produced by a process disclosed as in U.S. Pat. No. 4,162,167, refined and classified.

The silicon carbide fines comprise 97.6% by weight of beta-type crystalline, 0.41% by weight of free carbon and 0.14% by weight of oxygen, having the specific surface area of 17.8 m$^2$/g.

As a carbonaceous additive oil furnace black having an average particle size of 210 A and a specific surface area of 125 m$^2$/g was used.

10 g of said oil furnace black was mixed with 10.0 g of polyoxyethylene nonylphenol ether and 100 ml of distilled water, and the mixture was blended in a ball mill for 20 hours. 500 g of silicon carbide fines, 6.5 g of boron carbide powder having a specific surface area of 22.7 m$^2$/g, 190 ml of distilled water, 5.0 g of cellulose acetate and 5.0 g of tetramethyl ammonium hydroxide were added to the mixture and dispersed in Attoritor for 5 hours. The suspensoid was discharged from Attoritor, then passed through a sieve with a diaphragm pump under an application of vibration of 15 Hz. A sieve having an opening of 25 μm and a sieve frame of 200 mm diameter were used, and ultrasonic vibration of 26 KHZ, 600 W was applied to the suspensoid above the sieve. A pulsating pressure having the maximum value of 2.0 kg/cm$^2$, the minimum value of 0 kg/cm$^2$ and a fluctuation period of 1 second was applied to the suspensoid, and the pressure below the sieve was opened to the atmosphere. The passing rate of the suspensoid was 0.13 g/cm$^2$·sec. Discharged suspensoid from Attoritor was measured of its viscosity as 59 g/cm$^2$·sec with a B-type viscosimeter provided with Roter No. 4 at a rotating speed of 60 rpm.

The dispersed suspensoid was sprayed into a chamber maintained at a temperature of −60° C. to obtain freezed powder having an average particle size of 0.11 mm. The powder were dried in a chamber maintained at a pressure of 0.01–20 mmHg and a temperature of −5°−−10° C. to obtain dried powder having a bulk density of 0.72 g/cm$^3$.

An amount of the powder was preshaped into a shape with a metal die under a pressure of 0.15 t/cm$^2$ into a green shape. The shape was sintered in Tammann furnace under argon atmosphere. The sintering operation was held at the maximum temperature of 2100° C. for 30 minutes.

Figure 1:
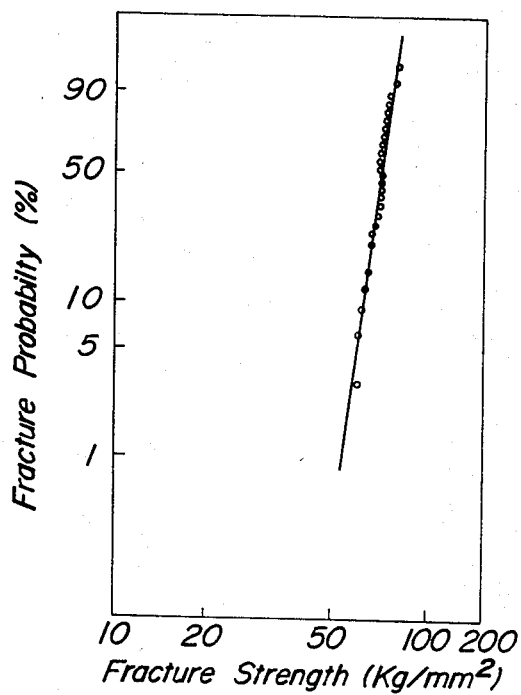
FIG. 1 shows a diagram representing relationships between fracture strength and fracture probability of sintered compacts described in Example 1.

The sintered compact showed a density of 3.14 g/cm$^3$. Then the compact was machined into a bar of 3×3×30 mm and finished with diamond dusts of 2 μm size. The finished bar was measured of its bending strength as 70.8 kg/mm$^2$ at the room temperature by the three point bending test machine having a span of 20 mm and the cross-head speed of 0.5 mm/min. Weibull factor of the compact is shown in FIG. 1 of a value of 15 which ensures high strength and reliability. The tests were carried on 30 pieces of sample and Weibull factor was calculated from Weibull logarithmic chart. The above-mentioned Weibull factor is calculated from a diagram showing the relationship between fracture stress and remaining probability in Weibull statistics generally used for measurement of ceramic strength which represents the reliability of fracture.

COMPARATIVE EXAMPLE 1

Same materials and procedure as in Example 1 were used provided that silicon carbide fines and sintering additive powder were passed through a sieve of 25 μm to remove coarse foreign matters. A sintered compact was produced without sieving operation after the uniform mixing of the materials.

Figure 2:
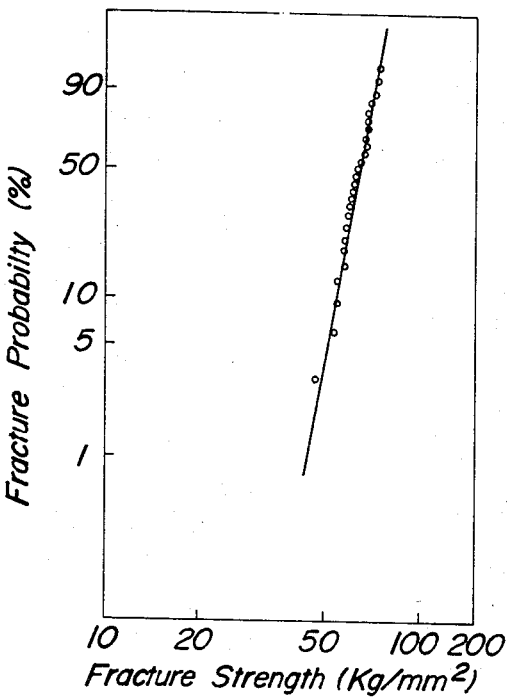
FIG. 2 shows a diagram representing relationships between fracture strength and fracture probability of sintered compacts described in Comparative Example 1.
Figure 3:
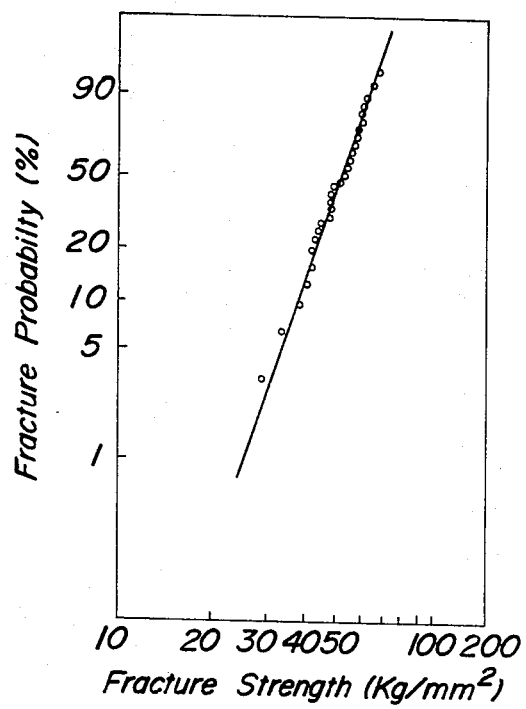
FIG. 3 shows a diagram representing relationships between fracture strength and fracture probability of sintered compact described in Comparative Example 2.

The sintered compact exhibited a density of 3.15 g/cm$^3$. The compact was measured of its strength in the same manner as in Example 1 and the average strength at the room temperature was 65.7 kg/mm$^2$. Weibull factor is 11 as shown in FIG. 2, and the average strength and reliability were inferior to that obtained in Example 1.

COMPARATIVE EXAMPLE 2 and EXAMPLE 3

Same materials and procedure were used provided that volumetric proportion of solid content comprising silicon carbide fines and sintering additive powder, amount of dispersing agent added, vibration applied to suspensoid, sieve opening, period of pressure fluctuation, maximum and minimum pressure to suspensoid and passing rate through a sieve were varied as shown in Table 1 with the results.

TABLE 1

|  | SiC (g) | B$_4$C (g) | C oil furnace black (g) | Dispersing medium solution water (ml) | Suspensoid Conc. (Vol %) | Suspensoid Viscosity (g/cm, sec) | Dispersing agent Polyoxyethylens nonyl phenol (g) | Dispersing agent Tetramethyl ammonium hydroxide (g) |
|---|---|---|---|---|---|---|---|---|
| Ex.1 | 500 | 6.5 | 10 | 290 | 36 | 59 | 10.0 | 5.0 |
| 2-1 | 500 | 6.5 | 10 | 200 | 45 | 205 | 10.0 | 5.0 |

TABLE 1-continued

| | | | | | | | | | |
|---|---|---|---|---|---|---|---|---|---|
| 2-2 | 500 | 6.5 | 10 | 650 | 20 | 18 | 10.0 | 5.0 | |
| 2-3 | 500 | 6.5 | 10 | 290 | 36 | 43 | 34.0 | 17.0 | |
| 2-4 | 500 | 6.5 | 10 | 290 | 36 | 71 | 2.0 | 1.0 | |
| 2-5 | 500 | 6.5 | 10 | 245 | 40 | 113 | 10.0 | 5.0 | |
| 2-6 | 500 | 6.5 | 10 | 245 | 40 | 113 | 10.0 | 5.0 | |
| Comparative Example 3 | 500 | 6.5 | 10 | 135 | 55 | 420 | 10.0 | 5.0 | |

| | Sieving operation | | | Pressure to suspensoid | | | Sintered compact | | |
|---|---|---|---|---|---|---|---|---|---|
| | Opening (m) | Rate (g/cm$^3$, sec) | Freq. (Hz) | Max. (kg/cm$^2$) | Min. (kg/cm$^2$) | Period (Sec.) | Density (kg/cm$^3$) | Strength (kg/mm$^2$) | Weibull factor |
| Ex. 1 | 25 | 0.13 | 15 | 2 | 0 | 1 | 3.14 | 70.8 | 15 |
| 2-1 | 25 | 0.02 | 15 | 4 | −0.2 | 1/10 | 3.15 | 68.8 | 16 |
| 2-2 | 25 | 1.2 | 4 | 1 | 0 | 1/10 | 3.12 | 67.4 | 15 |
| 2-3 | 25 | 0.13 | 15 | 1.5 | 0 | 1 | 3.14 | 69.4 | 15 |
| 2-4 | 25 | 0.08 | 15 | 2.5 | 0.5 | 1 | 3.14 | 69.9 | 14 |
| 2-5 | 63 | 0.46 | 100 | 2 | 0 | ½ | 3.15 | 62.6 | 11 |
| 2-6 | 25 | 0.02 | 350 | 3 | −0.3 | ½ | 3.15 | 68.5 | 15 |
| Comparative Example 3 | 63 | — | 10 | 1.5 | −0.2 | ½ | — | — | — |

EXAMPLE 3

Similar mixtures to Example 1 were used provided that in place of polyoxyethylene nonyl phenol ether, fatty acid salts, alkyl benzene sulfonates, straight chain alkyl benzene sulfonates, alpha-olefin sulfonates, sulfonate of naphthalene-formalin condensate and polyoxy ethylene alkyl ether were used respectively to prepare the suspensoids. The same procedure as Example 1 was repeated to obtain sintered compacts which showed the desired properties.

EXAMPLE 4

Similar mixtures to Example 1 were used provided that in place of tetramethyl ammonium hydroxide, monoethanol amine, monoethyl amine, diethyl amine, triethyl amine, propyl amine, isobutyl amine, monobutyl amine, di-n-propyl amine, tannic acid, sodium alginate, ammonium alginate, polyacrylic acid, polyacrylic acid amine, polyacrylic acid ester, polyacrylic acid ammonium, sodium lignin sulfonate, ammonium lignin sulfonate, carboxymethyl cellulose, sodium aluminate, ammonium aluminate and water glass were used respectively to prepare the suspensoids. The same procedure was repeated to obtain sintered compacts which showed the desired properties.

EXAMPLE 5

10 g of polyoxyethylene dodecyl amine and 100 ml of benzene were added to 10 g of oil furnace black used in Example 1 then mixed in a ball mill for 3 hours. To the resulting mixture, 500 g of silicon carbide fines used in Example 1, 6.5 g of boron carbide powder used in Example 1, 25 ml of benzene, 5.0 g of dioctyl succinic acid ammonium and 5.0 g of polyethylene glycol were added and dispersed in a vibrating mill for 4 hours. The resulting suspensoid is discharged under the operation of the mill, and subjected to the sieving operation under the conditions of 200 Hz of vibration, maximum pressure of 1.5 kg/cm$^2$ and minimum pressure of −0.2 kg/cm$^2$, pressure fluctuation period of ½ second and sieve passing rate of 0.28 g/cm$^2$·sec. Viscosity measured as in Example 1 was 42 g/cm·sec.

Suspensoid resulting from the above procedure was sprayed into a vessel maintained at a temperature of −50° C. to obtain freezed powders having an average particle size of 0.11 mm. The powders were dried in a vessel maintained at a pressure of 0.11–20 mmHg and a temperature of 0°−−5° C. The resulting dried mixture had a bulk density of 0.68 g/cm$^3$.

An amount of the dried mixture was pressed and sintered under the same procedure as Example 1 to obtain a compact having a density of 3.16 g/cm$^3$. The compact showed a strength at room temperature of 69.2 kg/mm$^2$ (average) and Weibull factor of 14.

EXAMPLE 6

8 g of propylene glycol fatty acid ester and 100 ml of acetone were added to oil furnace black used in Example 5 and the mixture was blended in a vibrating mill for 1 hour. 500 g of silicon carbide fines used in Example 1, 6.5 g of boron carbide powder used in Example 1, 470 ml of acetone, 5 g of polyethylene glycol, and 5 g of sodium dioctyl sulfosuccinate were added to the mixture, and dispersed in Attoritor for 4 hours to form suspensoid. The suspensoid was subjected to sieving operation as in Example 5 and sprayed into a vessel maintained at a temperature of −80° C. to obtain dried mixture in powder form. Viscosity of the suspensoid was 15 g/cm·sec.

An amount of the dried mixture was compacted and sintered as similar procedure as Example 1.

The sintered compact showed a bending strength at room temperature of 62.4 kg/mm$^2$ (average) and Weibull factor of 13.

EXAMPLE 7

350 ml of benzene, 10 g of sorbitan mono-oleate and 10 g of polyethylene glycol were added to a mixture comprising 500 g of silicon carbide fines used in Example 1, boron carbide powder used in Example 1 and 19.4 g of novolak-phenol resin containing 51.6% by volume of fixed carbon, and dispersed in a vibrating mill for 6 hours to obtain a suspensoid. Viscosity of the suspensoid was 48 g/cm·sec. The suspensoid was subjected to sieving operation as in Example 5 and spray dried to form powders. Sintered compacts were obtained under the same procedure as in Example 5.

The compact showed a density of 3.14 g/cm$^3$, a bending strength at the room temperature of 68.5 kg/mm$^2$ (average) and Weibull factor of 14.

As mentioned as above, in accordance with the present invention coarse foreign matters may be removed from sintering materials with which a sintered compacted having high bending strength and reliability may be produced at a relatively low cost.

What is claimed is:

1. In a method of producing a silicon carbide sintered compact comprising steps of placing silicon carbide fines, at least one sintering additive selected from a group consisting of boron containing additives, carbonaceous additives, beryllium containing additives and aluminum containing additives, and at least one shaping additive selected from a group consisting of polyethylene glycol, magnesium stearate, barium stearate, aluminum stearate, zinc stearate, stearic acid, starch, dextrin, gum arabic, casein, sugar, molasses, na-carboxymethyl cellulose, methyl cellulose, polyvinyl alcohol, polyvinyl methyl ether, polyacrylic amide, tannic acid, liquid paraffin, wax emulsion, ethyl cellulose, polyvinyl acetate, phenol resin, cellulose acetate, glycerol and polyethylene glycol, as required into a dispersing medium solution of water or organic liquid to form a suspensoid, performing a sieving operation of said suspensoid, processing and forming said suspensoid into a green compact from powders obtained in said sieving operation, and subjecting said green compact to a pressureless sintering process to produce a sintered compact:

the improvement comprising limiting the solid content comprising said silicon carbide fines and sintering additive within a range of 10–50% by volume to said suspensoid; when water is used as said dispersing medium solution, adding and dispersing at least one of the dispersing agents in the following group A, while when an organic liquid is used as said dispersing medium solution, adding and dispersing at least one of the dispersing agents in the following group B, in said solution to form a suspensoid, said organic liquid being selected from a group consisting of acetone, methenol, ethanol, butanol, hexane, heptane, nonane, toluene, xylene, ethyl methyl ketone, methyl isobutyl ketone, ethyl benzene, ethylene glycol, trichloroethylene, cyclohexane, nitromethane, nitroethane, isopropyl alcohol, benzene and carbon tetrachloride; applying a pressure differential to promote the sieving operation retarded by a pressure loss between, before and after said sieve, with or without vibration, to said suspensoid to pass a sieve having an opening less than 65 μm, removing coarse foreign matters which cause pores or inclusion affecting adversely the bending strength of said compact;

A. amines, organic compounds containing carboxyl group, organic compounds containing sulfo group, esters, ammonium compounds, organic compounds containing ether linkage, carboxylic acid salts, aluminates, phosphates, phosphoric acid complex salts, sulfonates and silicates;

B. amines, organic compounds containing carboxyl group, organic compounds containing sulfo group and esters.

2. Method as defined in claim 1, wherein said dispersing agent is added in a range of 0.05–15 parts by weight to 100 parts by weight of a mixture comprising silicon carbide fines and sintering additive.

3. Method as defined in claim 1, wherein said pressure differential in said suspensoid between before and after the sieve is fluctuated periodically in a range of 1/400–2 seconds.

4. Method as defined in claims 1 or 2, wherein a vibration in a range of frequency of 1–400 Hz is applied to said suspensoid.

* * * * *